United States Patent [19]

Van Dijnsen et al.

[11] Patent Number: 5,040,326

[45] Date of Patent: Aug. 20, 1991

[54] SYSTEM FOR DETECTING AND CAPTURING PESTS BY SUCTION

[76] Inventors: Gerardus J. A. M. Van Dijnsen, Franklin Rooseveltlaan 60, 4835 AC Breda; Mathijs A. Zanbergen, Mascagnilaan 8, 5056 BA Berkel Enschot, both of Netherlands

[21] Appl. No.: 514,230

[22] Filed: Apr. 25, 1990

[30] Foreign Application Priority Data

Apr. 25, 1989 [NL] Netherlands ............ 8901035

[51] Int. Cl.$^5$ ..................... A01M 23/00; A01M 23/02
[52] U.S. Cl. ........................... 43/58; 43/139; 43/65
[58] Field of Search ............ 43/65, 124, 58, 61, 43/64, 139, 140

[56] References Cited

U.S. PATENT DOCUMENTS

| | | | |
|---|---|---|---|
| 3,064,386 | 11/1962 | Horinek | 43/65 |
| 3,591,972 | 7/1971 | Hess | 43/58 |
| 3,965,608 | 6/1976 | Schuman | 43/139 |
| 4,138,796 | 2/1979 | Souza | 43/61 |
| 4,566,218 | 1/1986 | Kurosawa et al. | 43/58 |
| 4,780,986 | 11/1988 | Broomfield et al. | 43/139 |
| 4,835,900 | 6/1989 | Shifflett | 43/58 |
| 4,890,415 | 1/1990 | Fressola et al. | 43/58 |
| 4,965,959 | 10/1990 | Gagne | 43/61 |

FOREIGN PATENT DOCUMENTS

| | | |
|---|---|---|
| 0159634 | 10/1985 | European Pat. Off. . |
| 0283142 | 9/1988 | European Pat. Off. . |
| 8700138 | 8/1988 | Netherlands . |
| 0349122 | 9/1960 | Switzerland . |

*Primary Examiner*—Richard K. Seidel
*Assistant Examiner*—Jeanne M. Elpel
*Attorney, Agent, or Firm*—Dennis H. Lambert

[57] ABSTRACT

A system for the registration and combating of pests, such as mice and rats, for example, in which an electronic registration unit is connectable with one or more luring boxes selectively disposed in areas to be covered by the system. Each luring box is provided with an entrance aperture for the pest to enter the luring box, and detectors are associated with the luring boxes for producing a signal and sending it to the registration unit in response to the presence of a pest at the luring box. A suction unit is connectable with the luring box for applying a vacuum to the interior of the luring box to withdraw a pest from the luring box into the suction unit.

10 Claims, 1 Drawing Sheet

SYSTEM FOR DETECTING AND CAPTURING PESTS BY SUCTION

FIELD OF THE INVENTION

This invention relates to a system for combating pests, such as mice and rats. More specifically, the invention relates to such a system which includes an electronic registration unit that is connectable with one or more rodent detection means selectively mountable in an area to be covered by the system, which on detection of a rodent give a signal to the registration unit. The invention also includes means for destroying pests.

DESCRIPTION OF THE PRIOR ART

A system incorporating such an electronic registration unit and selectively mountable detectors is known from Dutch Patent Application No. 87 00138. This application discloses a device for the local registration of small, warm-blooded animals, such as rats and mice. In this known system, use is made of measuring boxes provided with infra-red sensors Which react to the presence of the body heat of, for example, mice. Such measuring or detection boxes are positioned unobtrusively at selected locations in an area to be guarded, such as, for example, a shop, warehouse or production area. The detection boxes produce a signal upon detecting a mouse, for example. This signal is converted into a counting pulse, which can be counted and registered in the measuring or detection box itself, or in a central registration unit, with which all such detection boxes are connected. On the basis of the measuring or detection results, it can be determined at what location or locations measures should be taken to control the pests, such as the positioning of poisonous bait, etc.

This system provides the advantage that the measures to be taken, such as the distribution of poisonous bait, can be limited to those locations where such pest control would be most meaningful. However, the disadvantage remains that a poisonous substance is still used to control the pests. If other measures are considered, such as the positioning of suitable traps, etc., this is accompanied by the disadvantage that combating of the pest becomes rather cumbersome.

SUMMARY OF THE INVENTION

It is an object of the invention to provide a system for the registering and control of pests, in which the disadvantages of use of poisonous substances and/or cumbersome traps are avoided.

Another object of the invention is to provide a system for detecting and combating pests, such as rodents, in a fast and efficient way.

To that end, the invention provides a system for detecting and combating pests, characterized in that the system comprises one or more luring boxes that can be selectively placed in an area to be guarded by the system, each luring box being provided with an entrance for a rodent, a rodent detecting means, a connection for an electronic registration unit, a suction unit, and a suction tube connectable with the suction unit.

As known, animals such as mice and rats show a natural tendency to crawl into enclosed areas by way of small apertures. Based on this natural tendency to crawl into enclosed areas, the invention makes effective use of luring boxes provided with an adapted small aperture through which a rodent, for example, may enter. The luring box is also provided with a suction duct through which the animal that has been lured into the enclosure is subsequently discharged at high speed, killed by the impact, and caught in a suction unit for later disposal.

The invention efficiently combines the use of such luring boxes with a detection and registration system, wherein each luring box includes a detection means for detecting the presence of an animal, produces a signal in response thereto, and uses the signal to register the animal and trigger operation of the suction system.

Each luring box preferably has a movement detector that reacts on the displacement or presence of the animal, and may include any suitable means, such as, for example, active infra-red, passive infra-red, radar, ultrasonic, microswitch, etc. A passive infra-red sensor, for example, reacts to the body heat of the animal, and a microswitch acts on contact or weight of the animal. Such a detector may be positioned, for example, behind the aperture of such a luring box.

With the system according to the invention, it is possible on the one hand to position the luring boxes without them being connected with the suction unit, so that the pests may be registered in the same manner as described in Dutch Patent Application No. 87 00138, enabling a determination of where the pests occur most and thus would be most efficiently combated. Thereafter, it can be decided which luring boxes of the system should be connected with the suction system for actual control or combating of the pests.

It is also possible to use a continuous mounting, whereby all luring boxes are directly connected with the suction system or a central suction system, and that will instantaneously react, on being signalled by the detectors. If a central suction system is employed, a valve system controlled in combination with a printed logic circuit (PLC) may be used to ensure that suction is only exerted in the luring box where an animal has been detected, thus avoiding waste of unnecessary suction power.

By the use of luring boxes in combination with a suction system and a registration system controlled by detectors, a universal system is obtained, suitable for registration only, elimination only, or a combination of registration and elimination. Such a system can be conveniently installed in an area to be guarded, such as, for example, a storage area, shop, or production facility. The connecting tubes for the suction system can be connected and disconnected as desired. If it is desired to eliminate the pests without registration of them, only the suction system needs to be mounted and connected.

BRIEF DESCRIPTION OF THE DRAWINGS

The foregoing, as well as other objects and advantages of the invention will become apparent from the following detailed description when considered in conjunction with the accompanying drawings, wherein like reference characters designate like parts throughout the several views, and wherein.

DETAILED DESCRIPTION OF THE PREFERRED EMBODIMENTS

Figure 1:
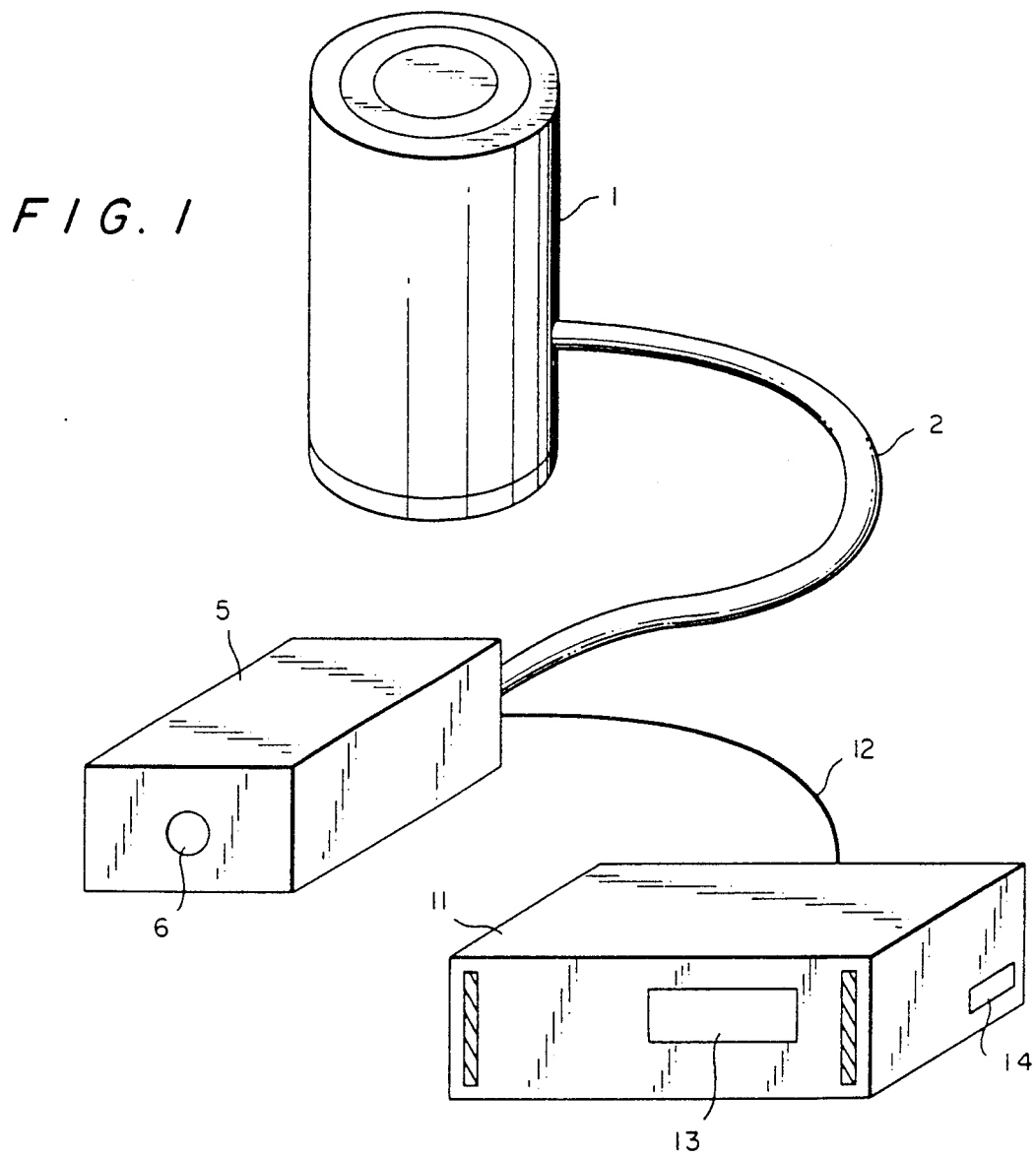
FIG. 1 is a diagrammatic representation, in perspective, of one embodiment using only one luring box.
Figure 2:
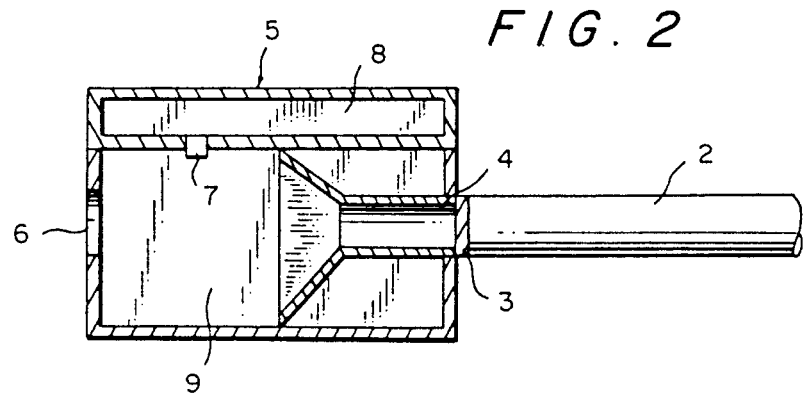
FIG. 2 is a longitudinal sectional view of the lure box.

Referring more specifically to the drawings, a suction unit is indicated at 1. This suction unit may consist of a heavy duty vacuum cleaner, or a vacuum drum which is maintained under vacuum by external means, or a strong centrifugal motor with chip box.

The suction unit 1 is connected by suction tube 2 and connection 3 with a suction port 4 at the rear of the luring box 5. The front of the luring box is provided with an entrance aperture 6, dimensioned in such a way that a small rodent, such as a mouse, may just enter therethrough.

A detector or sensor 7 is mounted in the luring box, near the entrance aperture 6, for example, and is activated by the presence of a rodent in the luring box. The sensor may comprise any suitable means, such as a passive infra-red sensor, for example. The sensor is part of a detector circuit, the remainder of which is housed in the area 8 of the box.

The inner area 9 of the box, which the arriving rodent enters, is in direct communication with the suction port 4, to which the suction tube 2 and suction unit 1 are connected.

A central registration unit 11 is also connected with the detector circuit by way of a connecting cable 12. The registration unit includes a display panel 13 and printer outlet 14.

Although only one luring box is shown in the system of FIG. 1, it is to be understood that a number of such luring boxes, disposed at various locations in the area to be guarded, may be connected with a central suction unit.

If such a system is operative, the detector 7 mounted in the luring box will produce a signal indicating the presence of a rodent when the rodent enters the luring box. This signal will be processed by the electronics 8 to an outlet signal that is passed to the central registration unit 11 by way of the connecting cable 12. This pulse is counted by way of a suitable counter circuit and the number registered per luring box is shown on the respective display panel 13, and stored in memory. A list of the registered number may be printed at intervals.

If the suction unit is not connected with the luring boxes, a selective registration takes place, from which it can be concluded which luring box or luring boxes should eventually be connected with the suction unit. If the suction unit is connected, each luring box will automatically accomplish its function of eliminating any rodent that enters the box. That is, as soon as a rodent has arrived in the interior area 9 of the luring box through aperture 6, the suction unit is activated by the detection signal so that the animal is removed at short notice through the suction tube 2 to the suction unit 1.

Energization of the suction unit can be accomplished by the detection means in the luring box, and can remain energized for a specific period of time, which can be set or adjusted in the suction unit.

A signalling device, for example a lamp or counter, is mounted on the suction unit to indicate whether the suction unit has been operative, thus avoiding the unnecessary control of the receptacle in the suction unit. This signal remains present until it is manually reset.

It is also possible to register and to eliminate simultaneously, whereby the suction unit and the registration unit operate in combination.

Although the system has been illustrated and described herein as adapted for combating pests such as rodents, including mice and rats, it could also be used for combating other pests by making suitable modifications. In such a case, the dimensions of the various boxes and their apertures would have to be adapted to the size of the pest to be detected and/or eliminated by the system.

In addition, a number of variations are possible, which all fall within the scope of the present invention. Thus, for example, the suction tubes of a number of luring boxes may emerge into the container of the suction unit, or may be connected with a distribution duct that is connected, in turn, with the suction unit. In addition, each luring box may comprise its own registration device in the form of a continuous counter, instead of using a central registration unit. Other variations and modifications will be apparent to a person having ordinary skill in the art.

We claim:

1. A system for the registration and capturing of pests, such as mice and rats, for example, comprising:
a suction means for producing a suction;
at least one luring box positionable in an area where pests are to be controlled, said luring box having opposite sides with an inlet aperture in one side thereof through which a pest can enter the luring box, and an outlet opening in another side;
a suction tube connecting said outlet opening with the suction means so that a suction is created in the luring box when the suction means is operated, whereby a pest entering the luring box is drawn by suction into and through the outlet opening and suction tube, said outlet opening including a funnel-shaped suction port extending across the interior of the luring box between the inlet aperture and outlet opening for guiding a pest into the outlet opening and suction tube; and
detection means in the luring box between the inlet aperture and suction port to detect the presence of a pest in the luring box.

2. A system as claimed in claim 1, wherein the detection means comprises an infra-red sensor for sensing body heat of a pest.

3. A system as claimed in claim 1, wherein:
there are a plurality of luring boxes, and each luring box has a detection means.

4. A system as claimed in claim 2, wherein:
there are a plurality of luring boxes, and each luring box has a detection means.

5. A system for the registration and capturing of pests, such as mice and rats, for example, comprising:
a suction means for producing a suction;
at least one luring box positionable in an area where pests are to be controlled, said luring box having opposite sides with an inlet aperture in one side thereof through which a pest can enter the luring box, and an outlet opening in another side;
a suction tube connecting said outlet opening with the suction means so that a suction is created in the luring box when the suction means is operated, whereby a pest entering the luring box is drawn by suction through the outlet opening and into and through the suction tube;
detection means in the luring box between the inlet aperture and outlet opening to detect the presence of a pest in the luring box; and
registration means connected with the detection means to register the number of pests entering the luring box, whereby a record of the number of pests entering the luring box at that location can be kept and a determination made whether to move the luring box to another location where most pests might be detected.

6. A system as claimed in claim 5, wherein:
the registration means is remote from the luring box and is connected with the detection means through a connection means.

7. A system as claimed in claim 6, wherein:
there are a plurality of luring boxes distributed in different locations;
each luring box has a detection means; and
registration means is connected with the detection means in each luring box.

8. A system as claimed in claim 5, wherein:
said outlet opening includes a funnel-shaped suction port extending across the interior of the luring box between the inlet aperture and outlet opening for guiding a pest into the outlet opening and suction tube.

9. A system as claimed in claim 7, wherein:
said outlet opening includes a funnel-shaped suction port extending across the interior of the luring box between the inlet aperture and outlet opening for guiding a pest into the outlet opening and suction tube.

10. A system for the registration and capturing of pests, such as mice and rats, for example, comprising:
a suction device for producing a suction;
a plurality of luring boxes connected with said suction device, each luring box having opposite sides, with an inlet aperture in one side through which a pest may enter the luring box, and an outlet opening in another side;
a suction tube connecting the outlet opening of each luring box with the suction device for producing a suction in the luring box, whereby a pest entering the luring box is drawn through the outlet opening and into and through the suction tube, said outlet opening including a funnel-shaped suction port extending across the interior of the luring box between the inlet aperture and the outlet opening for guiding a pest into the outlet opening and suction tube;
detection means in each luring box between the inlet aperture and outlet opening for detecting the presence of a pest in the luring box; and
registration means connectable with the detection means in the luring boxes for registering the number of pests entering the respective luring boxes, whereby the effectiveness of a particular luring box in any given location can be determined and that luring box moved, if appropriate.

* * * * *

UNITED STATES PATENT AND TRADEMARK OFFICE
CERTIFICATE OF CORRECTION

PATENT NO.   :   5,040,326

DATED        :   Aug. 20, 1991

INVENTOR(S)  :   Gerardus J. A. M. Van Dijnsen, et al.

It is certified that error appears in the above-identified patent and that said Letters Patent is hereby corrected as shown below:

On the title page, insert the following:

--[73]  Assignee:  ECOTRONICS B.V.,
                   THE NETHERLANDS--

Signed and Sealed this

Fifth Day of January, 1993

Attest:

DOUGLAS B. COMER

Attesting Officer

Acting Commissioner of Patents and Trademarks